United States Patent
Gioannini et al.

(10) Patent No.: US 7,140,345 B2
(45) Date of Patent: Nov. 28, 2006

(54) METHOD FOR CONTROLLING A DIESEL ENGINE WITH A COMMON-RAIL INJECTION SYSTEM DURING REGENERATION OF THE PARTICULATE FILTER

(75) Inventors: Alberto Gioannini, Orbassano (IT); Alessio Del Mastro, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 11/229,643

(22) Filed: Sep. 20, 2005

(65) Prior Publication Data
US 2006/0016424 A1 Jan. 26, 2006

Related U.S. Application Data

(63) Continuation of application No. 11/001,663, filed on Dec. 2, 2004, now Pat. No. 6,948,476.

(30) Foreign Application Priority Data
Dec. 9, 2003 (IT) .......................... TO2003A0987

(51) Int. Cl.
F02B 3/10 (2006.01)
F02D 41/40 (2006.01)
(52) U.S. Cl. ........................................ 123/299; 60/295
(58) Field of Classification Search ................ 123/299, 123/300, 304, 305, 339.12; 701/103–105, 701/109, 111; 60/295
See application file for complete search history.

(56) References Cited
U.S. PATENT DOCUMENTS
6,412,276 B1 7/2002 Salvat et al. .................. 60/295
6,491,016 B1* 12/2002 Buratti ........................ 123/299
6,694,945 B1* 2/2004 Kawaguchi et al. ......... 123/299
6,722,345 B1* 4/2004 Saeki et al. .................. 123/435
6,755,176 B1* 6/2004 Takeuchi et al. ............ 123/299

FOREIGN PATENT DOCUMENTS

| | | |
|---|---|---|
| EP | 1 108 876 A2 | 6/2001 |
| EP | 1 160 435 A2 | 12/2001 |
| EP | 1 172 531 A1 | 1/2002 |
| EP | 1 247 969 A2 | 10/2002 |
| EP | 1 281 852 A2 | 2/2003 |
| EP | 1 108 876 A3 | 9/2003 |
| EP | 1 160 435 B1 | 9/2004 |
| WO | WO 00/60228 | 10/2000 |

* cited by examiner

Primary Examiner—Willis R. Wolfe
Assistant Examiner—Johnny H. Hoang
(74) Attorney, Agent, or Firm—Berenato, White & Stavish

(57) ABSTRACT

Method for controlling a diesel engine with a common-rail injection system and a particulate filter, comprising the steps of performing at least one main injection (PRE, MAIN, AFTER) of fuel into a cylinder of the engine, the fuel being intended to take part in combustion inside the cylinder, and performing a post-injection (POST) in order to inject a predefined total quantity of fuel (QPOST) inside the cylinder, the post-injection being separated from the main injection (PRE, MAIN, AFTER) by means of a time separation interval such that the fuel injected during post-injection does not take part in combustion. The method also comprises the step of dividing the post-injection (POST) into a plurality of separate post-injections (POST1, POST2, POST3).

21 Claims, 1 Drawing Sheet

METHOD FOR CONTROLLING A DIESEL ENGINE WITH A COMMON-RAIL INJECTION SYSTEM DURING REGENERATION OF THE PARTICULATE FILTER

This is a continuation application of application Ser. No. 11/001,663 filed on Dec. 2, 2004 now U.S Pat. No. 6,948,476.

BACKGROUND OF THE INVENTION

1. Field of the Invention.

The present invention relates to a method for controlling a diesel engine with a common-rail injection system during regeneration of the particulate filter.

2. Description of the Related Art.

As is known, in order to reduce atmospheric pollution, the regulations in most countries are imposing increasingly stringent limits on the composition of the exhaust gases produced by internal combustion engines.

In particular, with regard to diesel engines, the main problems consist in the presence, within the exhaust gases, of nitrogen oxides (NOx) and particulate, while carbon oxides (CO) and hydrocarbons (HC) do not pose a particular problem.

Many methods have been proposed hitherto in order to reduce to minimum values the quantity of particulate present within the exhaust gases introduced into the atmosphere. Of these, however, without doubt the arrangement, along the gas exhaust pipe, of a particulate filter (DPF—Diesel-Particulate Filter), also known as "soot catcher" or "soot trap", has been recognised for many years in the motor car industry as the definitive solution to the problem of particulate emissions from diesel engines.

In more detail, a particulate filter generally consists of parallel channels with porous walls which are alternately obstructed. The obstructions force the exhaust gases to pass through the side walls of the channels such that the non-combusted particles forming the particulate are firstly retained inside the porosity of the said side walls and then, when the latter are completely filled, accumulate on the internal surfaces of the channel walls, forming a porous layer.

With the increase in the accumulation of particulate on the internal surfaces of the channel walls, the reduction in pressure on the particulate filter and therefore the backpressure produced by the said particulate filter also increase.

The particulate therefore cannot be accumulated indefinitely since large accumulations cause:

a deterioration in performance, drivability and consumption of the engine, until, in the most extreme case, stalling of the engine occurs; and destruction of the said particulate filter in the case of self-ignition and uncontrolled combustion of the particulate; in fact, the presence of large quantities of particulate, in particular driving conditions, may trigger "critical" regeneration phenomena consisting in the sudden and uncontrolled combustion of particulate: consequently, the high temperatures generated inside the ceramic lattice of the particulate filter may result in damage to the filter itself.

It is therefore necessary to remove periodically the particulate which has accumulated, performing so-called "regeneration" of the particulate filter. In particular, in the motor car industry, "regeneration" of the particulate filter is understood as meaning combustion of the accumulated particulate (composed mainly of carbon, C) which, in contact with the oxygen present in the exhaust gases, is converted into carbon monoxide, CO and carbon dioxide, $CO_2$.

However, this reaction occurs naturally (i.e. without the use of additives) only at temperatures higher than about 600° C. and these temperature levels are much higher than those which are measured at the inlet of the particulate filter during normal operating conditions of the engine.

It is therefore necessary, in certain conditions, i.e. when given levels of accumulated particulate are detected within the particulate filter, to raise artificially the temperature of the exhaust gases at the inlet of the said particulate filter so as to trigger automatically combustion of the particulate.

The regeneration of a particulate filter forms the main problem associated with the use of this type of filter in the motor car industry.

Numerous methods have been proposed and/or used hitherto in order to raise artificially the temperature of the exhaust gases at the inlet of the particulate filter and trigger combustion of the particulate.

In particular, the methods of automatically triggering combustion of the particulate may be roughly divided into two main categories, depending on the type of approach used: the first category involves automatic triggering methods which are based on the use of an additive in the diesel fuel which, acting as a catalyst, allows a reduction in the temperature at which regeneration starts by about 100–150° C., while the second category involves those methods of automatically triggering combustion of the particulate which are based on control of combustion of the engine.

In particular, the methods of automatically triggering combustion of the particulate based on the use of an additive require:

an exhaust system comprising a catalyst and a particulate filter which are incorporated inside a single housing (canister);

a particulate filter with a very large volume, typically equivalent to about twice the cubic capacity of the engine;

a gas fuel additive (based on cerium) which allows a reduction in the temperature for automatic triggering of regeneration by about 100–150° C.;

a very complex system for adding and automatically metering the additive on-board the vehicle; and engine control methods for increasing the temperature at the inlet of the particulate filter, since the necessary temperature levels cannot in any case be reached in conditions of normal use of the engine; in fact, this type of system functions correctly only in the case of operation of the engine under medium loads, while in the case of prolonged operation under low loads (for example when driving in towns) and/or in the presence of low external temperatures (in winter), the temperature of the exhaust gases in many cases does not manage to reach the self-triggering temperature.

The methods of automatically triggering combustion of the particulate based on the use of an additive, although they allow automatic triggering of regeneration of the particulate filter in the region of 450–500° C. and the particulate filter produces a low backpressure, have the following major limitations which prevent adequate and complete exploitation of all their positive aspects:

complexity, in particular of the system for adding and automatically metering the additive;

need for installation of a large-volume particulate filter since the additive present in the diesel fuel leaves a deposit of ash inside the particulate filter which gradually increases;

need to "clean" in any case the particulate filter of the ash about every 80,000 km, despite the large volume of the particulate filter; cerium, in fact, produces a large quantity of ash which accumulates inside the filter together with the particulate and cannot be eliminated by means of regeneration; this therefore results in a gradual increase in the backpressure of the filter on the engine with the increase in distance travelled by the vehicle and the consequent need to perform periodically disassembly and cleaning of the filter in order to eliminate the ash which has accumulated; and high cost, both in the case of the system for adding and automatically metering the additive and in the case of the large-volume particulate filter.

Owing to the numerous disadvantages listed above, for some time now nearly all motor car manufacturers have preferred the methods of automatically triggering combustion of the particulate not based on the use of an additive to those based on the use of an additive.

One of the solutions proposed and used in the past in order to raise artificially the temperature of the exhaust gases in the particulate filter without the use of an additive envisaged equipping the said particulate filters with heating elements which were periodically activated in order to raise the temperature of the particulate filter to that for automatic triggering of combustion of the trapped particulate.

More recently, instead, solutions have been proposed where the increase in the temperature of the exhaust gases at the inlet of the particulate filter is obtained by means of methods involving control of the engine combustion.

In particular, the methods commonly used in order to raise the temperature at the particulate filter inlet are:

regulating the main injection in order to obtain retarded combustion;

performing a post-injection following the main injection; or modulating the intake air so as to reduce it (for example reducing the supercharging or throttling the intake).

In detail, the method based on delay of the main injection has drawbacks due to the fact that the main injection may not be retarded beyond a certain limit, otherwise it would cause an unstable combustion which would result in misfiring, with the consequent production of white/blue smoke and problems associated with driving performance, in particular lack of response. For these reasons, with this method it is not possible to obtain, at low speeds and with low engine loads, high temperatures at the particulate filter inlet.

International patent application PCT/IT95/00124 filed on Jul. 21, 1995 by the Applicant and published on Feb. 8, 1996 under number WO-A-96 03571 instead proposes a method in which the increase in the temperature of the exhaust gases at the particulate filter inlet is obtained by performing, in addition to the main injection, a post-injection during the expansion step.

In particular, the timing of post-injection with respect to the main injection and the quantity of injected fuel are determined so that combustion of the fuel during the expansion phase is such as to produce an increase in the temperature of the exhaust gases sufficient to automatically trigger regeneration of the particulate filter.

International patent application PCT/IT95/00123 filed on Jul. 21, 1995 by the Applicant and published on Feb. 8, 1996 under number WO-A-96 03572 also proposes a method where the increase in the temperature of the exhaust gases at the particulate filter inlet is obtained by performing, in addition to the main injection, a post-injection during the exhaust phase.

In particular, since generally the particulate filter is incorporated inside a single housing (canister) together with a DeNOx catalyst arranged upstream of the particulate filter, a post-injection performed mainly during the engine exhaust phase has the effect that the injected fuel does not contribute, albeit to a small degree, to combustion and therefore reaches the catalyst directly in non-combusted form.

The non-combusted hydrocarbons thus introduced into the catalyzer trigger an exothermic oxidation reaction which produces raising of the temperature of the exhaust gases at the catalyzer outlet and consequently an increase in the temperature of the exhaust gases entering the particulate filter.

Compared to the methods of automatically triggering combustion of the particulate based on the use of an additive, the methods of automatically triggering combustion of the particulate based on control of combustion of fuel require:

a particulate filter having a volume substantially equal to the cubic capacity of the engine, i.e. half that required by the methods of automatically triggering combustion of the particulate based on the use of an additive:

an exhaust system which may alternately:

have a configuration similar to that required by the methods of automatically triggering combustion of the particulate based on the use of an additive, namely comprising a catalyst and a particular filter which are incorporated inside a single housing (canister); or comprise a single filter with deposited thereon both the oxidizing elements of the catalyst and metals (Ce+Pt) which reduce the self-ignition temperature (catalysed soot filter);

no additive in the diesel fuel;

no system for adding and automatically metering the additive on-board the vehicle; and engine control methods for increasing the temperature at the particulate filter inlet.

In particular, the difference between use of an exhaust system comprising a catalyst and a particulate filter which are incorporated inside a single housing (canister) and the use of an exhaust system comprising a single filter with deposited thereon both the oxidizing elements of the catalyst and metals which reduce the self-ignition temperature consists in the fact that in the first type of exhaust system self-triggering of regeneration occurs at about 600° C. and the particulate filter has a low backpressure, while in the second type of exhaust system self-triggering of regeneration occurs at about 450° C., but the particulate filter has a high backpressure and there exists both the risk of a reduced regeneration efficiency, owing to contact between the cesium and the particulate, and the risk of drift in the regeneration efficiency, namely an increase in the regeneration triggering temperature.

The appearance of second generation common-rail injection systems has resulted in notable progress in the sector of particulate filter regeneration.

For a more detailed description of the subject of common-rail injection systems, reference may be made, for example, to European patent application 00104651.5 filed on Mar. 3, 2000 by the Applicant and published on Sep. 13, 2000 under number EP-A-1,035,314, the contents of which are regarded as being fully incorporated here.

As is known, in fact, this type of injection system allows the execution, during each engine cycle and inside each engine cylinder, of one or more of the following injections, as shown in FIG. 1, which details moreover the timing and the engine angles at which injection is performed:

- a main injection MAIN performed in the vicinity of the combustion TDC;
- a pre-injection PRE prior to the main injection MAIN and performed sufficiently close to the main injection MAIN to achieve continuity of combustion with the main injection MAIN;
- a post-injection AFTER following the main injection MAIN and also performed sufficiently close to the main injection MAIN to achieve continuity of combustion with the main injection MAIN;
- a pre-injection PILOT prior to the pre-injection PRE, which is carried during the compression step and is well in advance of the combustion TDC so much so that it does not participate in combustion of the fuel injected during the pre-injection PRE; and
- a post-injection POST following the post-injection AFTER and performed with a notable delay relative to the combustion TDC so as not to participate in combustion of the fuel injected during the post-injection AFTER.

Each of the injections listed above produces a specific effect on operation of the engine which allows a well-defined object to be achieved.

In particular:

- the injection PILOT causes an increase in the pressure inside the cylinder at the end of the compression phase and this increase consequently produces a reduction in the engine start-up time, a reduction in the noise and smokiness of the engine during the transient warm-up phase of the engine and an increase in the torque output by the engine at low speeds;
- the injection PRE causes a reduction in the ignition delay, namely the time which lapses between injection of the fuel inside the main cylinder MAIN and the actual start of combustion inside the cylinder and this reduction in the ignition delay consequently causes a reduction in the combustion noise produced by the engine;
- the injection AFTER causes post-oxidation of the exhaust gases inside the cylinder and this post-oxidation causes consequently a reduction in the quantity of particulate generated during combustion; and
- the injection POST causes injection of a quantity of fuel during the exhaust phase which, since actual combustion has already terminated, is not burnt and reaches the exhaust unaltered, thus determining an increase in the hydrocarbons HC which are present in the exhaust and which, in turn, activate the DeNOx catalyst, causing an increase in the efficiency thereof. The exothermic oxidation reaction which occurs inside the DeNOx catalyzer also causes raising of the temperature of the exhaust gases at the inlet of the particulate filter which, as is known, is situated downstream of the DeNOx catalyzer, allowing regeneration of the particulate filter.

It is also possible to divide the injection MAIN into two separate injections so as to produce a reduction in the temperature peaks produced by combustion and, consequently, a reduction in the quantity of nitrogen oxides NOx produced during combustion.

For a more detailed description of subject of multiple injections, reference may be made, for example, to the abovementioned European patent application 00104651.5 filed on Mar. 3, 2000 by the Applicant and published on Sep. 13, 2000 under number EP-A-1,035,314.

Owing to the extreme flexibility of the second generation common-rail injection systems, in European patent application 02017387.8 filed on Aug. 2, 2002 by the Applicant and published on Feb. 5, 2003 under number EP-A-1,281,852, the contents of which are considered fully incorporated herein, it was proposed achieving raising of the temperature of the exhaust gases necessary for regeneration of the particulate filter by simply adjusting timing of one or more of the injections with respect to the timing which they assume when regeneration of the particulate filter is instead not performed.

In particular, a detailed study carried out by the Applicant has led to the definition, for each operating point of the engine, of particular combinations and timings of the multiple injections described above which allow self-triggering of regeneration of the particulate filter.

In addition to this, the study carried out by the Applicant was able to verify how the effect of these particular timings and combinations of the multiple injections on regeneration of the particulate filter may be further improved by adjusting other parameters of the engine and/or the injection system, such as the flowrate of the intake air, the injection pressure and the quantity of exhaust gases which are recirculated.

In particular, broadly speaking the methods for regeneration of the particulate filter highlighted by the Applicant envisage the following actions for raising the temperature of the exhaust gases at the inlet of the particulate filter:

- performing three or four of the injections PILOT, PRE, MAIN and AFTER with a suitable delay relative to the timings of the injections performed in conditions where there is no regeneration of the particulate filter, said injections taking part in the combustion process and allowing a delayed and stable combustion to be achieved, raising the temperatures of the exhaust gases; and
- performing the post-injection POST so as to supply hydrocarbons HC to the DeNOx oxidizing catalyzer situated upstream of the particulate filter and make use of the consequent exothermic oxidation reaction thereof in order to raise thus further the temperature of the exhaust gases at the outlet of the oxidizing catalyzer and therefore at the inlet of the particulate filter.

The presence of a post-injection POST performed with a large delay with respect to the combustion TDC (100°–180° after the TDC) is indispensable for correct operation of the method for particulate filter regeneration proposed in the abovementioned patent application EP-A-1,281,852, but has drawbacks associated with the problem of dilution of the lubricating oil.

In fact, the considerable distance from the combustion TDC in terms of crank angle, which is a characteristic of this type of injection, has the effect that the charging conditions inside the cylinder (in particular the pressure and temperature values) are unfavourable from the point of view of penetration of the jet of injected fuel. Essentially, in these conditions, the aerodynamic resistance of the charge and the heat exchanges between the latter and the liquid jet are not sufficient to prevent part of the fuel injected with the injection POST from striking the film of lubricating oil present on the cylinder liners. The droplets of fuel, following contact with the film of lubricating oil, are enveloped inside the said film, in view of the perfect miscibility between the two liquids. With each engine cycle, the veil of lubricating oil contaminated with fuel is conveyed back into the oil sump by one of the resilient rings mounted around the piston (so-called oil scraper rings).

The procedure described above is not the only way in which the fuel is able to come into contact with the lubricating oil.

In fact, owing to the blow-by flow, part of the gases inside the cylinder containing a high percentage of non-combusted hydrocarbons pass by the piston rings directly into the oil sump. Obviously the level and the speed with which the two liquids interact depends on the operating conditions of the engine and on the conditions in which the vehicle is used.

The problems described above are aggravated by the fact that, in order to be able to inject during the injection POST the quantities of fuel necessary for reaching the temperature at which oxidation of the particulate is activated, it is required to operate with maximum penetration of the fuel jet where the jet strikes the cylinder walls; this inevitably results in interaction between the film of lubricating oil and the fuel.

The exposure of the lubricating oil to the fuel results in dilution thereof, expressed as a percentage by weight of fuel present inside the solution, and therefore an alteration of the lubricating properties. In particular, this alteration results in a reduction in the kinematic viscosity of the lubricating oil, which constitutes the main parameter for assessing the quality of the lubricating oil.

From the literature on the subject it can be stated that even a reduction in the viscosity in the region of 30% requires replacement of the lubricating oil, since the latter is no longer able to perform its main functions (reduction of friction, protection of mechanical parts against wear, heat disposal, etc.).

The problem of dilution of the lubricating oil described above is present during the injection POST and therefore during regeneration of the particulate filter over the whole operating range of the engine; however, it becomes even more critical at engine points with low revolutions/loads. In fact at these engine points, the conditions inside the cylinder are less favourable for the purposes of a reduction in penetration of the fuel jet, and the quantities of fuel injected during the injection POST necessary for reaching the temperature triggering oxidation of the particulate are higher.

SUMMARY OF THE INVENTION

The object of the present invention is that of providing a method for controlling an internal combustion engine during regeneration of the particulate filter, which is able to overcome the drawbacks described above.

The above object is achieved by the present invention in that it relates to a method for controlling a diesel engine with a common-rail injection system and a particulate filter, comprising the steps of performing at least one main injection of fuel into a cylinder of said engine, said fuel being intended to take part in combustion inside said cylinder, and performing a post-injection in order to inject a predefined total quantity of fuel inside said cylinder, said post-injection being separated from said main injection by means of a time separation interval such that the fuel injected during said post-injection does not take part in said combustion, characterized in that it comprises the step of dividing said post-injection into a plurality of separate post-injections.

BRIEF DESCRIPTION OF THE DRAWINGS

For better understanding of the present invention, a preferred embodiment thereof is now described purely by way of a non-limiting example with reference to the accompanying drawings in which.

DETAILED DESCRIPTION OF THE PREFERRED EMBODIMENTS

The idea underlying the present invention is based on the realization that the abovementioned problem of dilution of the lubricating oil due to mixing with the fuel injected inside the cylinder during the injection POST may be eliminated, or at least greatly reduced, by acting on the way in which the jet of fuel is injected inside the cylinder, with the aim of modifying the penetration of the said jet and ensuring that the lubricating oil is exposed only minimally to the fuel.

In this connection, there are various parameters which help determine the method of penetration of the fuel in the liquid phase inside the cylinder following an injection of these parameters, the main ones are as follows:

parameters associated with the processes which occur during vaporization of the fuel droplets, including mixing with air, exchange of energy between the gaseous phase and liquid phase, etc.;

parameters associated with the engine settings, including the quantity of fuel injected during each injection, the injection pressure, the duration of injection, etc.;

parameters associated with the charging conditions inside the cylinder, including the temperature and the pressure of the gases; and parameters dependent upon the engine characteristics, including the size of the injector holes, the type of electric command imparted to the injector, etc.

Of the parameters listed above, the present invention envisages modulating the quantity of fuel injected during the injection POST, in order to control penetration of the fuel jet inside the cylinder.

In detail, according to a feature of the invention, the injection POST is divided into a suitable number of fractions so that the individual fractions possess a quantity of movement which is less than the quantity of movement possessed individually by the injection POST of the known type. In this way the capacity of the fuel to penetrate inside the cylinder and consequently the exposure of the lubricating liquid to the said fuel is reduced. In other words, by dividing the injection POST into several fractions it is possible to adapt the quantity of injected fuel to the charging conditions inside the cylinder and therefore to the aerodynamic resistance offered by the gases to the fuel jet.

In particular, in a preferred embodiment of the present invention, the number of injections into which the injection POST is divided is at the most three and is determined on the basis of the engine point.

Figure 1:
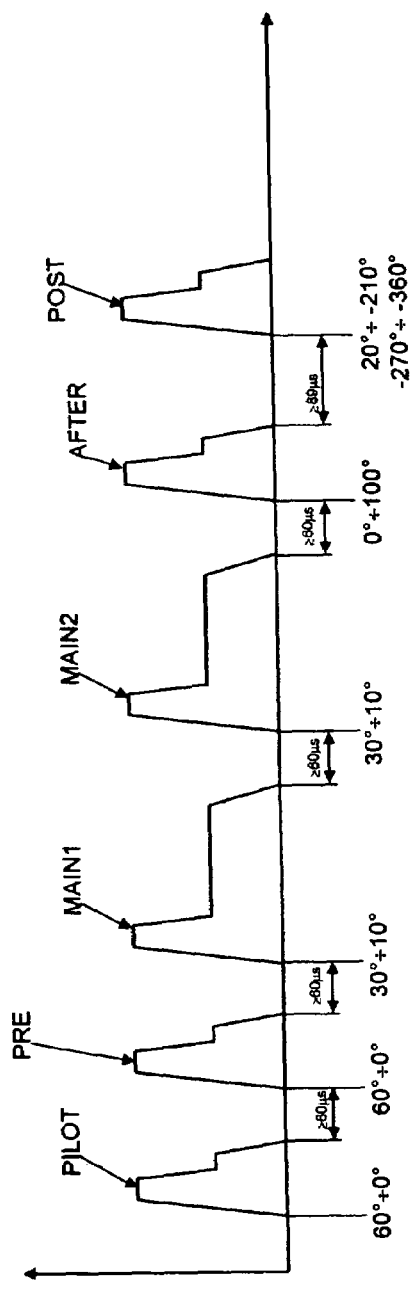
FIG. 1 shows a time diagram of the multiple injections which can be performed with a common-rail injection system.
Figure 2:
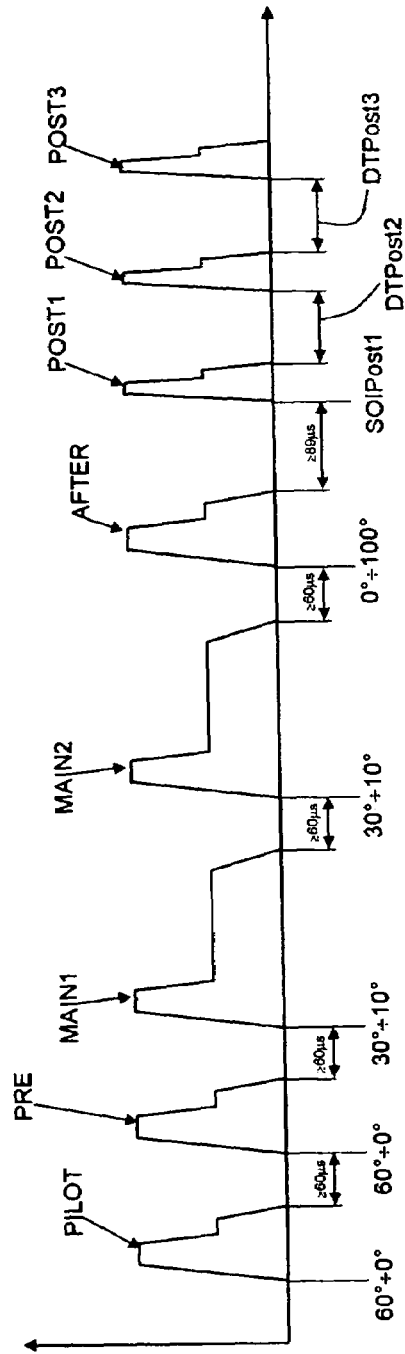
FIG. 2 shows the temporal division of the post-injection POST according to a preferred embodiment of the present invention.

FIG. 2 shows a time diagram relating to the method of multiple injection of fuel performed in accordance with a preferred embodiment of the method for controlling an engine according to the present invention.

In particular, in the first part of the time diagram, it is possible to identify the injections PILOT, PRE, MAIN and AFTER described above with reference to the state of the art. According to the invention, in the second part of the time diagram, instead of a single injection POST, three separate fractions are present, indicated by POST1, POST2 and POST3, respectively. In a manner similar to that of the state of the art, the first fraction POST1 is separated from the injection AFTER by a time interval which is greater than or equal to 89 μs so as to intervene once combustion inside the cylinder has been completed.

The quantities of fuel to be injected during the various fractions POST1, POST2 and POST3 is determined from the total quantity of fuel QPOST to be injected during the injection POST, calculated on the basis of the engine point.

In detail, firstly the quantity of fuel to be injected during the last two fractions POST2 and POST3, indicated by QPOST2 and QPOST3, respectively, is determined in percentage terms with respect to the total quantity to be injected QPOST and then the quantity of fuel to be injected during the first fraction POST1, indicated by QPOST1, is calculated, as the difference between the total quantity QPOST and the sum of the quantities QPOST2 and QPOST3.

Since electric injectors are unable to inject a quantity of fuel less than a predefined minimum threshold, in the case where one of the quantities of fuel to be injected QPOST2 and QPOST3 is less than this predefined minimum threshold, the two fractions POST2 and POST3 are combined.

Moreover, if also the sum of the two quantities QPOST2 and QPOST3 is less than the predefined minimum threshold, then all three fractions POST1, POST2 and POST3 are combined, thus resulting in return to the solution with single injection POST.

As regards timing of the various fractions, firstly the starting point of the, first fraction POST1 is fixed (indicated in the figure by SOIPost1) so that it occurs at an engine angle such as not to participate in combustion inside the cylinder. Typically the time interval between the end of the injection AFTER and the start of the first fraction POST1 is greater than or equal to 89 μs. Subsequently, depending on the engine point, the relative positions of the last two fractions POST2 and POST3 are determined by means of choice of a suitable dwell time between the first and the second fraction, DTPost2, and between the second and third fraction, DTPost3 (the term "dwell time" indicates the distance between the end of the electric command for an injection and the start of the electric command for the next injection inside the same cylinder).

From an examination of the characteristics of the method for controlling an internal combustion engine during regeneration of the particulate filter performed in accordance with the present invention the advantages which can be obtained therewith are obvious.

In particular, the division of the injection POST into several fractions allows, for the same quantity of fuel injected and charging conditions inside the cylinder, a reduction in dilution of the lubricating oil due to regeneration of the particulate filter and therefore preservation of the lubricating properties and an increase in the duration of the said lubricating oil.

The abovementioned advantages are valid over the whole operating range of the engine, but assume greater importance during operation at low speeds/loads. In this condition, in fact, the quantity of fuel injected during the injection POST is maximum, owing to the high difference between the temperature of the exhaust gases during normal operation and the target temperature for regeneration, and the charging conditions inside the cylinder are most unfavourable from the point of view of resistance to penetration of the fuel jet.

Finally, it is obvious that modifications and variations may be made to the method for controlling an internal combustion engine during regeneration of the particulate filter described and illustrated here, without thereby departing from the scope of protection of the present invention, as defined in the accompanying claims.

In particular, it is clear that it is possible to vary the number of fractions into which the injection POST is divided, their relative position with respect to the combustion TDC and the quantity of fuel injected during the individual fractions.

The invention claimed is:

1. A method for controlling a diesel internal combustion engine having a common-rail fuel injection system and a particulate filter, said method comprising the steps of:
   performing at least one main injection of fuel into a cylinder of said engine, said main injection of fuel being intended to take part in combustion inside said cylinder, and
   performing a plurality of post-injections of fuel during an expansion stroke of said diesel internal combustion engine in order to inject a predetermined total quantity of fuel inside said cylinder, wherein an initial one of said post-injections of fuel being separated from said main injection by a time separation interval of at least 89 μs, said post-injections of fuel injected such that it does not take part in said combustion.

2. The method according to claim 1, wherein prior to said step of performing a plurality of post-injections, the step of calculating an optimum number of post-injections is performed on the basis of an operating point of said engine.

3. The method according to claim 2, wherein said optimum number of post-injections is no more than three post-injections.

4. The method according to claim 1, in which said step of performing a plurality of post-injections comprises the step of dividing said predetermined total quantity of fuel amongst said plurality of post-injections.

5. The method according to claim 4, in which said plurality of post-injections comprises an initial injection, an intermediate injection, and a final injection and in which said step of dividing up said post-injections comprises the steps of:
   calculating an intermediate quantity of fuel to be injected during said intermediate injection and a final quantity of fuel to be injected during said final injection, as predefined percentages of said total quantity of fuel; and
   calculating an initial quantity of fuel to be injected during said initial injection, as the difference between said total quantity of fuel and said intermediate and final quantities of fuel.

6. The method according to claim 5, further comprising the steps of comparing said intermediate and final quantities of fuel with a predefined minimum threshold and activating said initial injection, intermediate injection and final injection if both said intermediate and final quantities of fuel are greater than said predefined minimum threshold.

7. The method according to claim 6, further comprising the steps of calculating a combined quantity of fuel equal to the sum of said intermediate and final quantities of fuel if at least one of said intermediate and final quantities of fuel is less than said predefined minimum threshold.

8. The method according to claim 7, further comprising the step of comparing said combined quantity of fuel with said predefined minimum threshold and activating said initial injection with said initial quantity of fuel and a single successive injection with said combined quantity of fuel if said combined quantity of fuel is greater than said predefined minimum threshold.

9. The method according to claim 8, further comprising the steps of activating a single injection with said total quantity of fuel if said combined quantity of fuel is less than said predefined minimum threshold.

10. The method according to claim 6, in which said step of performing said post-injection comprises the steps of:
    determining an initial instant of said initial injection on the basis of an operating point of said engine; and
    determining time separation intervals between said initial injection and said intermediate injection and between said intermediate injection and said final injection on the basis of said operating point.

11. The method according to claim 10, wherein said initial instant of said initial injection commences at 89 μs after conclusion of said main injection.

12. The method according to claim 11, further comprising the step of calculating a number of post injections of fuel based on operations parameters of said diesel engine and determining an optimum quantity of fuel for each of said calculated post injections.

13. The method according to claim 12, wherein a sum of said optimum quantities of fuel being equal to said predetermined quantity of post injected fuel.

14. The method according to claim 12, wherein said step of determining said number of post injections and quantity of fuel therefore ensures that a minimum threshold of fuel is injected during each post injection.

15. The method according to claim 14 further comprising the step of determining time intervals between each aid number of post injections of fuel based on an operating time of said diesel engine.

16. The method according to claim 1, wherein said main injection includes a plurality of fuel injections for combustion in said diesel internal combustion engine, said initial post fuel injection occurring at 89 μs from a conclusion said main injection of fuel.

17. A method for controlling a diesel internal combustion engine having a common-rail fuel injection system and a particulate filter, said method comprising the steps of:
    performing at least one main injection of fuel into a cylinder of said engine, said main injection of fuel being intended to take part in combustion inside said cylinder,
    determining a number of a plurality of spaced apart post-injections of fuel based upon operating point of the engine,
    performing said plurality of spaced apart post-injections of fuel during an expansion stroke of said diesel internal combustion engine after said step of performing said at least one main injection in order to inject a predefined total quantity of fuel inside said cylinder such that said post injections of fuel do not take part in said combustion, wherein said spaced apart post-injections are set at intervals based on the operating point of the engine.

18. The method according to claim 17, wherein commencement of an initial post injection occurs at least 89 μs after conclusion of said main injection.

19. The method according to claim 17, wherein said step of determining said number of post injections and quantity of fuel therefore ensures that a minimum threshold of fuel is injected during each post injection.

20. The method according to claim 17, wherein said plurality of post-injections comprises an initial injection, an intermediate injection, and a final injection, said method further comprising the steps of:
    calculating an intermediate quantity of fuel to be injected during said intermediate injection and a final quantity of fuel to be injected during said final injection, as predefined percentages of said total predetermined quantity of fuel; and
    calculating an initial quantity of fuel to be injected during said initial injection, as the difference between said total quantity of fuel and said intermediate and final quantities of fuel.

21. The method according to claim 20, wherein said step of performing said post-injections comprises the steps of:
    performing said initial instant of said initial injection at 89 μs after conclusion of said main injection; and
    determining time separation intervals between said initial injection and said intermediate injection and between said intermediate injection and said final injection on the basis of an operating point of said engine.

* * * * *